UNITED STATES PATENT OFFICE.

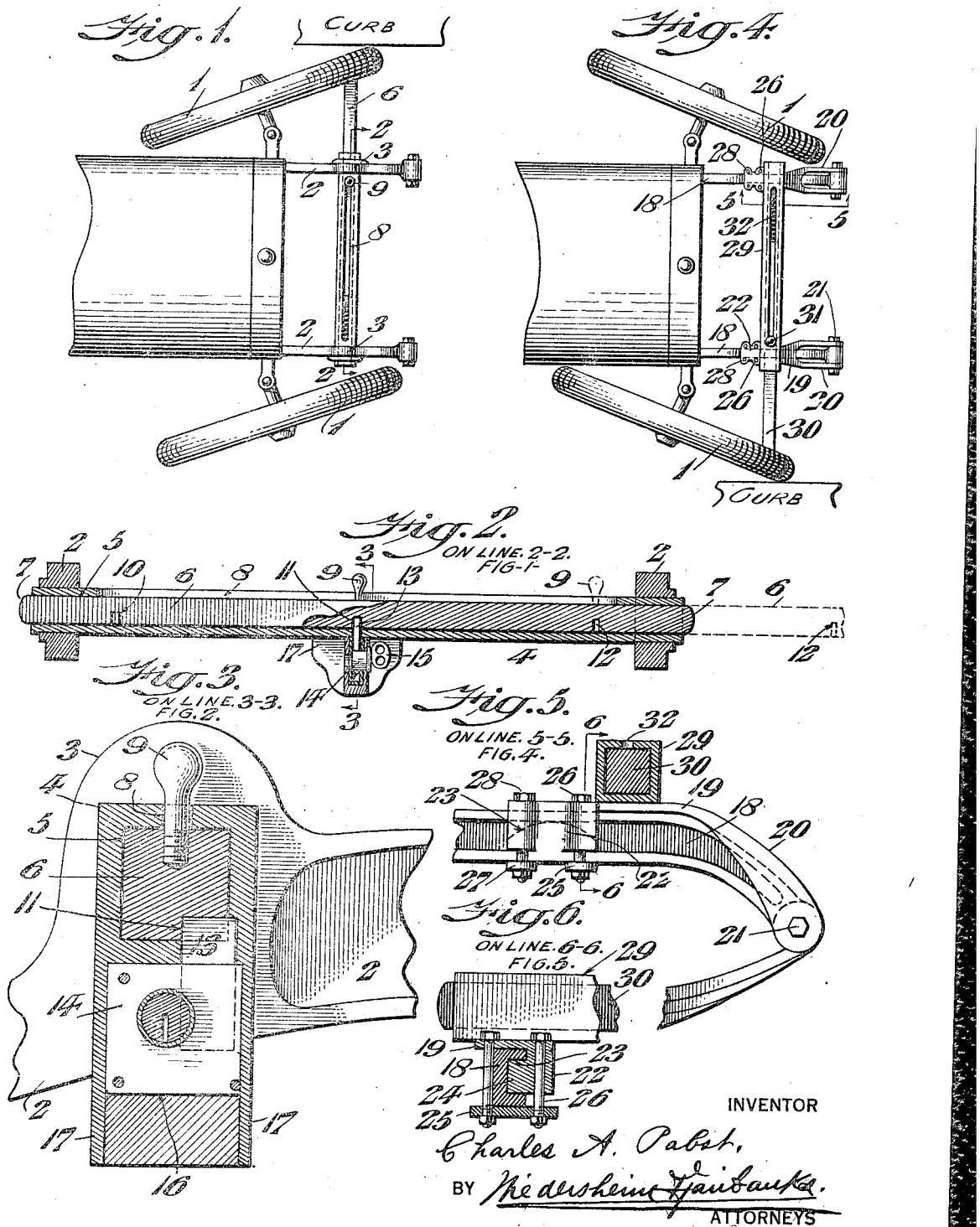

CHARLES A. PABST, OF PHILADELPHIA, PENNSYLVANIA.

LOCKING DEVICE FOR AUTOMOBILES AND OTHER VEHICLES.

1,223,825.  Specification of Letters Patent.  Patented Apr. 24, 1917.

Application filed December 29, 1916. Serial No. 139,465.

*To all whom it may concern:*

Be it known that I, CHARLES A. PABST, a citizen of the United States, residing in the city and county of Philadelphia, State of Pennsylvania, have invented a new and useful Locking Device for Automobiles and other Vehicles, of which the following is a specification.

The object of my present invention is to devise a locking mechanism for vehicles, and especially for automobiles, in order to prevent anyone from stealing the machine and removing it from the place where the operator has left it.

A further object of my invention is to devise a locking mechanism for automobiles which serves not only to lock the wheels in position but also serves to reinforce the chassis frame and also serves as a bumper to prevent injury to the radiator and its adjuncts or to the lamps in case another vehicle hits the front of the automobile.

A further object of my invention is to devise a locking mechanism, wherein the locking bar is effective to lock the wheels in position irrespective of the direction in which they have been turned.

A further object of my invention is to devise a locking mechanism which is connected to and forms a part of the chassis frame.

A further object of my invention is to devise a locking mechanism which can be formed as an integral part of the automobile structure or one which can be formed as an attachment to be rigidly connected to automobiles now in use.

Other novel features of construction and advantage will hereinafter more clearly appear in the detailed description of my invention.

For the purpose of illustrating my invention, I have shown in the accompanying drawings typical embodiments thereof, which are at present preferred by me, since the same will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a top plan view of a portion of an automobile, in conjunction with which a locking mechanism embodying my invention is employed.

Fig. 2 represents a section taken substantially on line 2—2 of Fig. 1, the locking bar being shown in its neutral or inoperative position.

Fig. 3 represents a section on line 3—3 of Fig. 2.

Fig. 4 represents a top plan view of a portion of an automobile, in conjunction with which another embodiment of my invention is illustrated.

Fig. 5 represents a section on line 5—5 of Fig. 4.

Fig. 6 represents a section on line 6—6 of Fig. 5.

Similar numerals of reference indicate corresponding parts in the figures.

Referring to the drawings:—

1 designates the running wheels of an automobile which may be of any desired or conventional construction. 2 designates the channel bars of the chassis frame, and in Figs. 1, 2 and 3, I have shown my invention as forming an integral part of the chassis frame, while in Figs. 4, 5 and 6 I have shown my invention as constructed in such a manner that it can be readily attached to any type of chassis frame now in use.

Referring first to the embodiment seen in Figs. 1, 2 and 3, the channel bars 2 are provided with the bosses or enlargements 3, in which is rigidly secured a tube or casing 4 which is preferably made of steel and provided with a longitudinally extending aperture 5. This aperture preferably has its walls of a polygonal contour, and for purpose of illustration, I have shown these walls as being rectangular in cross section in order to receive a polygonal shaped locking member 6 which consists of a locking bar longitudinally slidable in the aperture 5. The ends of this bar are preferably rounded or beveled, as indicated at 7, see Fig. 2. The top face of the casing 4 is provided with a longitudinally extending slot 8, through which extends a handle 9, which is detachably connected with the locking member 6, and in order to illustrate one manner of forming such connection, the handle 9 is shown as being in threaded engagement with the locking member 6, as seen in Fig. 3.

One face of the locking member 6, for example the under face thereof, is provided with the plunger receiving recesses 10, 11 and 12, with the walls of which the plunger 13 of the lock 14 engages. The lock 14 may be of any desired or conventional type, such as for example, a pin lock, which is actuated only by a special key 15. The lock 14 is contained within the chamber 16, the walls of which are integral with and centrally located of the casing 4. The casing 4 is preferably provided with the depending plates 17 which tend to prevent dust and foreign material coming into contact with the lock.

In the embodiment seen in Figs. 4, 5 and 6, 18 designates the channel bars of the chassis frame. 19 designates brackets having downwardly deflected bifurcated arms 20 which are secured by means of bolts 21 to the ends of the channel bars 18 of the chassis frame. The brackets 19 are provided with the blocks 22, which are provided in one side near their upper ends with a crescent shaped or curved recess 23, thereby forming a lug 24 which is adapted to be received between the flanges of the channel bar, while the upper flange of the channel bar is received in the recess 23.

25 designates a cross bar which passes beneath the channel bars and through which pass the bolts 26 which are provided with nuts, it being seen that two of these bolts 26 are employed so that a bracket is securely locked with respect to the channel bar. One of the bolts passes through the lock 22 and the cross bar 25, and the other bolt, as seen in Fig. 6, passes through the bracket 19 and the cross bar 25 and is juxtaposed to the side wall of the channel bar.

I also preferably provide a second cross bar 27 which extends beneath the channel bar and is secured with respect thereto by means of the bolts 28 which receive the nuts which bear against the cross bar 27. The brackets 19 have fixedly connected therewith in any desired manner, the casing 29 which conforms in construction to the casing 4, and in which is slidingly mounted a polygonal shaped locking member 30 conforming in construction to the locking member 6 and provided with an actuating handle 31 which has limited longitudinal movement in the slot 32 in the upper face of the casing 29.

It will be noted that in each of the embodiments herein illustrated, the locking mechanism cannot be removed from the car without dismantling the car. The longitudinally slidable bar, such as 6 or 30, contacts with the rim of the wheel when the wheels are turned, and it will be seen that in the embodiment seen in Figs. 1, 2 and 3, in order to lock the wheels in inoperative position, it is only necessary to move the handle 9 in the direction in which the wheels have been turned until the handle 9 strikes the shoulder formed by the end of the slot 8, at which time the recess 12 is in alinement with the plunger 13 of the locking mechanism. The operator then actuates the lock to cause the plunger 13 to enter into the recess 12. If an unauthorized person now tries to operate the car under its own power, the automobile will simply travel in a circle or run up on the curb, and as is apparent, the same difficulty arises if an unauthorized person attempts to tow the car from the place where it has been left by the owner.

It will be seen that when the wheels have been turned in the opposite direction from that seen in Fig. 1 or as seen in Fig. 4, the locking bar is shifted to the right and the plunger of the lock is caused to interlock with the recess 10 in the locking member.

When the parts are in the position seen in Fig. 2, the locking member is fixed in its neutral or inoperative position, and serves with its casing to reinforce the chassis frame and also to act as a bumper to prevent any injury to the automobile lamps or the radiator or its hood, in case another automobile should run into or back into the front of the car. After the brackets 19 have once been assembled in position, they cannot be pried out of place or removed without first disconnecting them from the channel bars. The locking member is positioned in such a manner with respect to the wheels that when the wheels are turned into the proper position, it can only engage or contact with the rim of the wheel, so that in case the wheels revolve, no injury is done to the metal rim or to the locking member, which is preferably formed from a metal bar.

It will now be apparent that I have devised a novel and useful locking device for automobiles and other vehicles, which embodies the features of advantage enumerated as desirable in the statement of the invention and the above description, and while I have, in the present instance, shown and described typical embodiments thereof which will give in practice satisfactory and reliable results, it is to be understood that the same are susceptible of modification in various particulars without departing from the spirit or scope of the invention or sacrificing any of its advantages.

Having thus described my invention, what I claim as new and desire to secure by Letters Patent, is:—

1. In a locking mechanism for automobiles, the combination with the running wheels and the chassis frame, of a casing carried by said chassis frame, a locking member adjustably carried by said casing and adapted to abut against either running wheel to prevent the steering of said wheels, and means to secure said locking member in its adjusted position.

2. In a locking mechanism for automobiles, the combination with the running wheels and the chassis frame, of a casing secured to said chassis frame and provided with a slot, a locking bar longitudinally slidable in said casing, and adapted to abut against either of said wheels to prevent their steering, an actuating handle extending through said slot and connected with said locking bar to effect its adjustment, and means to secure said locking bar in its adjusted position.

3. The combination with the chassis frame and the running wheels of an automobile, of a casing secured to said chassis frame and provided with a polygonal shaped aperture extending through its ends, a polygonal shaped bar slidable in said aperture to bring an end in contact with a juxtaposed running wheel, said bar, when moved in an opposite direction, being adapted to engage the other running wheel and means to secure said bar in its operative and inoperative positions.

4. In a locking mechanism for automobiles, the combination with the running wheels and the chassis frame, of a casing extending transversely of the chassis frame and connected therewith, a bar slidable in said casing and provided with a plurality of recesses, said bar being adapted to engage either running wheel to prevent the steering thereof, and a lock carried by said casing and provided with a plunger adapted to engage one of said recesses to secure said bar in its adjusted position.

5. In a locking mechanism for automobiles, the combination with the running wheels and the channel bars of the chassis frame, of a casing extending laterally of and connected to said channel bars and provided with a slot in one of its walls, a locking bar longitudinally slidable in said casing and adapted to extend through either end to contact with the juxtaposed running wheel, an actuating handle extending through said slot and engaging said locking bar, and a lock carried by said casing to interlock with said locking bar.

6. In a locking mechanism for automobiles, the combination with the running wheels, of a chassis having apertures therethrough, a tubular casing secured in said apertures, a locking member adjustable in said casing and adapted to have its ends abut against either of the running wheels to prevent their steering, and means to secure said locking member in its adjusted position.

7. In a locking mechanism for automobiles, the combination with the running wheels and the chassis frame, of a casing carried by said chassis frame, a bar longitudinally adjustable in said casing, movable laterally of said chassis frame and adapted to abut against either running wheel to prevent the steering of said running wheels, and locking mechanism carried by said casing, and having means to engage said bar to lock it in its operative or inoperative position.

8. In a device of the character described, a locking bar, movable longitudinally in substantial parallelism to the front axle of the running wheels and adapted to abut at either end against the juxtaposed wheel, a support for said bar, and means for enabling said bar to be locked against either running wheel to prevent its steering.

9. In a device of the character described, the combination with running wheels of a vehicle, of means carried by said vehicle for laterally contacting with the rim of either running wheel to hold the wheels in a deflected position without preventing them from rotating on their axes, and locking mechanism to secure said means in its operative and inoperative positions.

10. In a device of the character described, the combination with the chassis frame and the running wheels of a support extending laterally across and connected with the chassis frame and forming a bumper, and a wheel locking member carried by said support and adapted to abut against the rim of either running wheel to prevent the steering of said wheels without preventing their rotation.

CHARLES A. PABST.

Witnesses:
H. S. FAIRBANKS,
C. D. McVAY.